(12) United States Patent
Akalinli et al.

(10) Patent No.: US 7,945,355 B2
(45) Date of Patent: May 17, 2011

(54) FLIGHT CONTROL METHOD USING WIND DATA FROM AIRPLANE TRAJECTORY

(75) Inventors: Serdar Akalinli, Stockholm (SE); Anders Palm, Åkersberga (SE); Lars G V Lindberg, Åkersberga (SE); Christer Forsberg, Täby (SE)

(73) Assignee: AVTECH Sweden AB, Akersberga (SE)

( * ) Notice: Subject to any disclaimer, the term of this patent is extended or adjusted under 35 U.S.C. 154(b) by 344 days.

(21) Appl. No.: 12/354,230

(22) Filed: Jan. 15, 2009

(65) Prior Publication Data

US 2010/0049382 A1 Feb. 25, 2010

Related U.S. Application Data

(60) Provisional application No. 61/006,657, filed on Jan. 25, 2008.

(51) Int. Cl.
*G01C 23/00* (2006.01)
(52) U.S. Cl. .............................. 701/14; 701/18
(58) Field of Classification Search .................. 701/3–5, 701/10, 14, 16, 18, 202, 209, 210; 340/949; 707/918–921; 702/3
See application file for complete search history.

(56) References Cited

U.S. PATENT DOCUMENTS

| | | | | |
|---|---|---|---|---|
| 4,642,775 A * | 2/1987 | Cline et al. | ...................... | 701/200 |
| 5,522,567 A * | 6/1996 | Kinstler | ...................... | 244/3.15 |
| 5,657,009 A * | 8/1997 | Gordon | ...................... | 340/968 |
| 6,043,756 A * | 3/2000 | Bateman et al. | ............... | 340/968 |
| 6,134,500 A * | 10/2000 | Tang et al. | ...................... | 701/202 |
| 6,148,259 A * | 11/2000 | Hagelauer | ...................... | 701/122 |
| 6,163,743 A * | 12/2000 | Bomans et al. | ................... | 701/3 |
| 6,199,008 B1 * | 3/2001 | Aratow et al. | ................. | 701/120 |
| 6,266,610 B1 * | 7/2001 | Schultz et al. | ................. | 701/201 |
| 6,311,107 B1 * | 10/2001 | Curto et al. | ....................... | 701/14 |
| 6,600,991 B1 * | 7/2003 | Jardin | ........................... | 701/206 |
| 6,937,937 B1 | 8/2005 | Manfred et al. | | |
| 7,027,898 B1 * | 4/2006 | Leger et al. | ...................... | 701/14 |
| 7,611,098 B2 * | 11/2009 | Van Boven | .................... | 244/183 |
| 7,877,197 B2 * | 1/2011 | Lewis et al. | ..................... | 701/120 |
| 2004/0078136 A1* | 4/2004 | Cornell et al. | ................. | 701/120 |

(Continued)

OTHER PUBLICATIONS

Tong et al., Descent Profile Options for Continuous Descent Arrival Procedures Within 3D Path Concept, Oct. 2007, IEEE/AIAA 26th Digital Avionics System Conference (DASC '07), vol. 3.A.3, pp. 1-11.*

(Continued)

*Primary Examiner* — Thomas G Black
*Assistant Examiner* — Lindsay M Browder
(74) *Attorney, Agent, or Firm* — Drinker Biddle & Reath LLP (57) ABSTRACT

The invention involves a method comprising the steps of
  providing (S3) a wind data set (3) including wind data of a plurality of positions,
  receiving (S4) data for a predicted airplane trajectory (311),
  providing (S5), based on the wind data set (3), a set of wind data elements (302), each including data concerning wind at a position along the predicted airplane trajectory (311),
  repeating steps of selecting a subset of wind data elements (302S), creating a wind profile (303), and comparing the wind profile (303) to the set of wind data elements (302), and
  selecting (S10) to be sent to a subscriber (2, 4) a subset of wind data elements (302S) based at least partly on which a wind profile (303) was created corresponding to the largest extent to the set of wind data elements (302).

18 Claims, 7 Drawing Sheets

U.S. PATENT DOCUMENTS

2007/0179703 A1* 8/2007 Soussiel et al. ............... 701/200
2009/0012663 A1* 1/2009 Mead et al. .................... 701/14

OTHER PUBLICATIONS

Kuenz et al., Green Trajectories in High Traffic TMAs, Oct. 2007, IEEE/AIAA 26th Digital Avionics Systems Conference (DASC '07), vol. 1.B.2, pp. 1-11.*

Korn et al., 4D FMS for Increasing Efficiency of TMA Operations, Oct. 2006, 25th IEEE/AIAA Digital Avionics Systems Conference, pp. 1-8.*

Clarke, Continuous Descent Arrivals: Noise, Emissions, and Fuel Burn Reductions, Jul. 2007, Georgia Institute of Technology Air Transportation Laboratory, pp. 1-31.*

Less Noise and Exhaust by Using "Green Approach" at Arlanda Airport [Online]. Stockholm Arlanda Airport, Jan. 20, 2006 [retrieved on Jun. 22, 2009]. Retrieved from the Internet: <URL:www.skycontrol.net/airports/less-noise-and-exhaust-by-using-%E2%80%9Cgreen-approach%E2%80%9D-at-arlanda-airport/>.

* cited by examiner

Fig. 6

FLIGHT CONTROL METHOD USING WIND DATA FROM AIRPLANE TRAJECTORY

RELATED APPLICATION DATA

This application claims priority under 35 U.S.C. §119(e) to U.S. Provisional Application No. 61/006,657, filed Jan. 25, 2008, the entire contents of which are incorporated herein by reference.

TECHNICAL FIELD

The present invention relates to flight control. More specifically, the invention relates to a method comprising the steps of providing data related to wind, and sending data related to wind to a subscriber, for example a subscribing airplane. The invention also refers to a computer program, and a computer program product comprising a computer readable medium, for carrying out steps of the aforementioned method.

BACKGROUND

It is known in airplane operations applications to exchange data between airplanes and ground stations concerning atmospheric conditions, in order to improve the flight operations.

U.S. Pat. No. 6,937,937 describes measurement aboard a plurality of monitoring airplanes to record local atmospheric conditions. The recorded data is transmitted in real-time to ground-monitoring stations, capable of compiling the data to generate real-time three-dimensional maps of weather conditions aloft. Also, a set of predictive indicia can be created for a subscribing airplane. When requesting predictive indicia, the subscribing airplane may indicate information such as its current location, altitude, heading, and flight-path, so that the predictive indicia can be specifically tailored to the needs of the subscribing airplane.

It is suggested in U.S. Pat. No. 6,937,937, since it is expected that the size of data-batches uploaded to subscribing users will be greater than that downloaded from requesting users or from monitoring airplanes, to provide high bandwidth for uploads but lower bandwidth for downloads. However, taking into account the large number of radio transmissions related to flight control and airports, there is a need to keep any additional bandwidth requirements low. Further, U.S. Pat. No. 6,937,937 is not concerned with the need to reduce fuel-consumption and emissions from airplanes, especially on descent for landing.

The press information from The Swedish Civil Aviation Administration on Jan. 20, 2006, 'Less noise and exhaust by using "green approach"' (http://www.lfv.se/templates/LFV_ListArticle_39601.aspx) discloses a system creating an accurate airplane time navigation by providing a more precise estimated time of arrival. The flight management system of an airplane receives, shortly after take-off, from a ground control centre at the destination a message specifying the approach path that should be used at the destination. The flight management system calculates an arrival time based on the approach path and current flying conditions. The flight management system also calculates the time and position at which the airplane's descent to the destination should begin. This is done so as to provide an approach trajectory such that a minimum of engine thrust is used and the airplane essentially glides or coasts through its descent, reducing noise, exhaust gases and fuel-consumption. Such approach trajectories have become known as "green approaches" or CDA (Continuous Descent Approaches). The arrival time calculated by the flight management system is sent to the ground control centre, where it is inserted in a list of expected arrivals of a plurality of airplanes. If two or more arrivals should coincide, an additional message is sent to the airplane, stating an adjusted arrival time. The flight management system then makes a new calculation and adjusts the airplane's speed and/or trajectory, so that the landing can occur at the specified time. Such a speed adjustment can occur at the beginning of the flight. It should be mentioned that traditional airplane approaches normally involve a stepwise descent where engine thrust is increased intermittently and often the airplane is directed to a "holding pattern"; waiting for its time to land, resulting in large excesses of fuel-consumption, emissions, and noise.

The calculation of the time of the start of the airplane's descent is based partly on wind information, which can be received from a flight planning centre, and which could be several hours old. However, to provide effective information so as to reduce the fuel-consumption and emissions of descending airplanes, there is a need to improve said wind information, especially since "green approaches" are particularly sensitive to the wind patterns encountered during the descent.

SUMMARY OF THE INVENTION

It is an object of the present invention to reduce fuel-consumption and emissions from airplanes, especially on descent for landing.

It is also an object of the present invention to improve flight control, preferably without increasing substantially the bandwidth requirements of radio transmissions.

It is a further object of the present invention to improve flight control to reduce fuel-consumption and emissions from airplanes, without increasing substantially the bandwidth requirements of radio transmissions.

These objects are reached with a method comprising the steps of providing data related to wind, and sending data related to wind to a subscriber, wherein the step of providing data related to wind comprises providing a wind data set including wind data of a plurality of positions, the method further comprising the steps of receiving data for a predicted airplane trajectory, providing, based on the wind data set, a set of wind data elements, each including data concerning wind at a position along the predicted airplane trajectory, selecting from the set of wind data elements a subset of wind data elements, creating, based at least partly on the selected subset of wind data elements, a wind profile along the predicted airplane trajectory, comparing the wind profile to the set of wind data elements, repeating the steps of selecting a subset of wind data elements, creating a wind profile, and comparing the wind profile to the set of wind data elements, and selecting to be sent to the subscriber a subset of wind data elements based at least partly on which a wind profile was created corresponding to the largest extent to the set of wind data elements, wherein the step of sending data related to wind to the subscriber comprises sending to the subscriber the subset of wind data elements selected to be sent.

Depending on the embodiment of the invention, the subscriber can be a number of different alternative entities, for example a subscribing airplane or, as described further below, a ground station, for flight traffic control.

It should be noted that the wind data of a plurality of positions, herein also referred to as wind and position data, is data mapping wind information, particularly wind direction and wind speed, to positions. Said positions are preferably three-dimensional positions, given in a suitable manner, for example with ground reference coordinates and altitudes. The wind data set can be created based at least partly on wind and position data received at a central unit. The wind and position data can be obtained in a number of different ways. For example, it can be recorded in a plurality of monitoring airplanes, it can be recorded in other types of aerial vehicles, for example weather balloons, and/or it can be recorded by meteorological measurement and observation equipment, other than such provided in aerial vehicles.

For this presentation, the expression predicted airplane trajectory incorporates both ground reference positions and altitudes, i.e. the predicted airplane trajectory is three-dimensional. It should also be mentioned that by data for a predicted airplane trajectory, is meant data representing or corresponding to a predicted airplane trajectory, in a manner known in itself in the art. Further, the data for the predicted airplane trajectory can be received from the subscriber, for example a subscribing airplane, or as mentioned below, a ground station.

Preferably, the subset of wind data elements selected from the set of wind data elements includes a predetermined number of wind data elements. The subset of wind data elements can be selected from the set of wind data elements arbitrarily or through a suitable selection scheme.

As exemplified below, the subset of wind data elements, based at least partly on which a wind profile corresponding to the largest extent to the set of wind data elements can be created, can be a subset of wind data elements which is optimal in the sense that the corresponding wind profile renders the least difference in comparison to the set of wind data elements.

The invention makes it possible to select optimal wind data elements to be transmitted to subscribing airplane. The optimal wind data elements will provide effective information for flight planning of descending airplanes so as to reduce their fuel-consumption and emissions. More particularly, during the descent through several altitude layers, an airplane is often subjected to a large variety of wind changes. The invention reduces the risk of unexpected wind changes during "green approaches", resulting in the need to use engine thrust.

In addition, the invention can be advantageously used for many flight management systems available on the market, which are adapted to receive a limited number, e.g. three, wind data elements. More specifically, the invention provides for such wind data elements to be optimally selected for recreating in the flight management system a wind profile corresponding to a large extent to actual wind conditions. Further, the invention provides for transmitting a few optimally selected wind data elements with a small amount of data in the transmission. Thus, the bandwidth requirements of such radio transmissions will be low.

Preferably, the predicted airplane trajectory includes at least a portion of a descent to an airport of an airplane, which could be the subscriber. Thereby it will be possible to make use of the wind data elements received by the subscribing airplane during a phase of the flight thereof in which adjustments of the airplane trajectory can provide a large increase in time accuracy and a large reduction in fuel-consumption. Preferably, a position and/or a time of a start of the descent is determined or adjusted based at least partly on the subset of wind data elements sent to the subscriber. Preferably, a speed of descent of the airplane is determined or adjusted based at least partly on the subset of wind data elements sent to the subscriber.

Preferably, the step of providing, based on the wind data set, a set of wind data elements, comprises selecting from the wind data set a wind data subset such that the wind data subset includes wind data of positions in a vicinity of the predicted airplane trajectory, and providing, based on the wind data subset, the set of wind data elements. Here, the vicinity of the predicted airplane trajectory is regarded as any position within 100 km from the predicted airplane trajectory, preferably within 50 km from the predicted airplane trajectory.

Preferably, the step of providing, based on the wind data subset, a set of wind data elements, includes interpolation of wind data of the wind data subset to the predicted airplane trajectory.

Preferably, the step of creating, from the selected subset of wind data elements, a wind profile along the predicted airplane trajectory, includes interpolation of the selected subset of wind data elements.

Preferably, the wind profile includes head and/or tail wind components. This will make the wind data elements transmitted to the subscribing airplane adapted to the needs of effective flight control, since head and/or tail wind components are of main interest for flight planning for fuel saving purposes during descent.

Preferably, in addition to the data for the predicted airplane trajectory, time data correlated to the data for the predicted airplane trajectory is received, for example from the subscriber. Thus, flight data received from the subscribing airplane can include the predicted airplane trajectory data as well as data mapping the predicted airplane trajectory to time information, so as to provide a four dimensional correlation between predicted positions and time, below referred to as a 4DT (4-Dimensional Trajectory).

The time data will allow adjustment of the airplane trajectory not only in view of optimal fuel economy performance but also in view of a required arrival time at a specified position. For example, for a descent before landing, the time data will allow adjustment of the airplane trajectory not only in view of an optimal glide angle given by aerodynamic considerations, but also in view of the time at which the airplane is to reach a certain position, for example the position at landing. Thus, the time data combined with the optimal wind data elements will provide possibilities to increase the time accuracy and predictability of descending airplanes so as to improve the accuracy of arrival times for effective time navigation. The increased the time accuracy will improve air traffic management at the airport of the destination.

The objects are also reached with a computer program according to any of the claims 11-17, and a computer program product according to claim 18.

DESCRIPTION OF THE FIGURES

Below, the invention will be described in detail with reference to the drawings, in which FIG. 1 a schematic view of an environment in which a method according to an embodiment of the invention is carried out.

DETAILED DESCRIPTION

Figure 1:
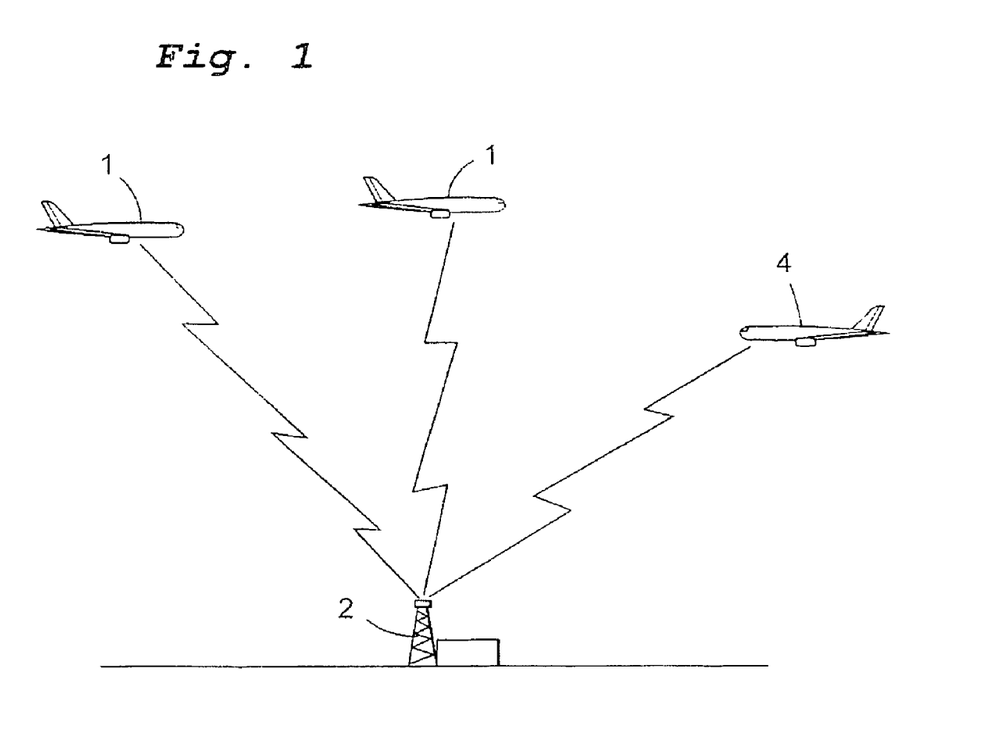
Figure 2:
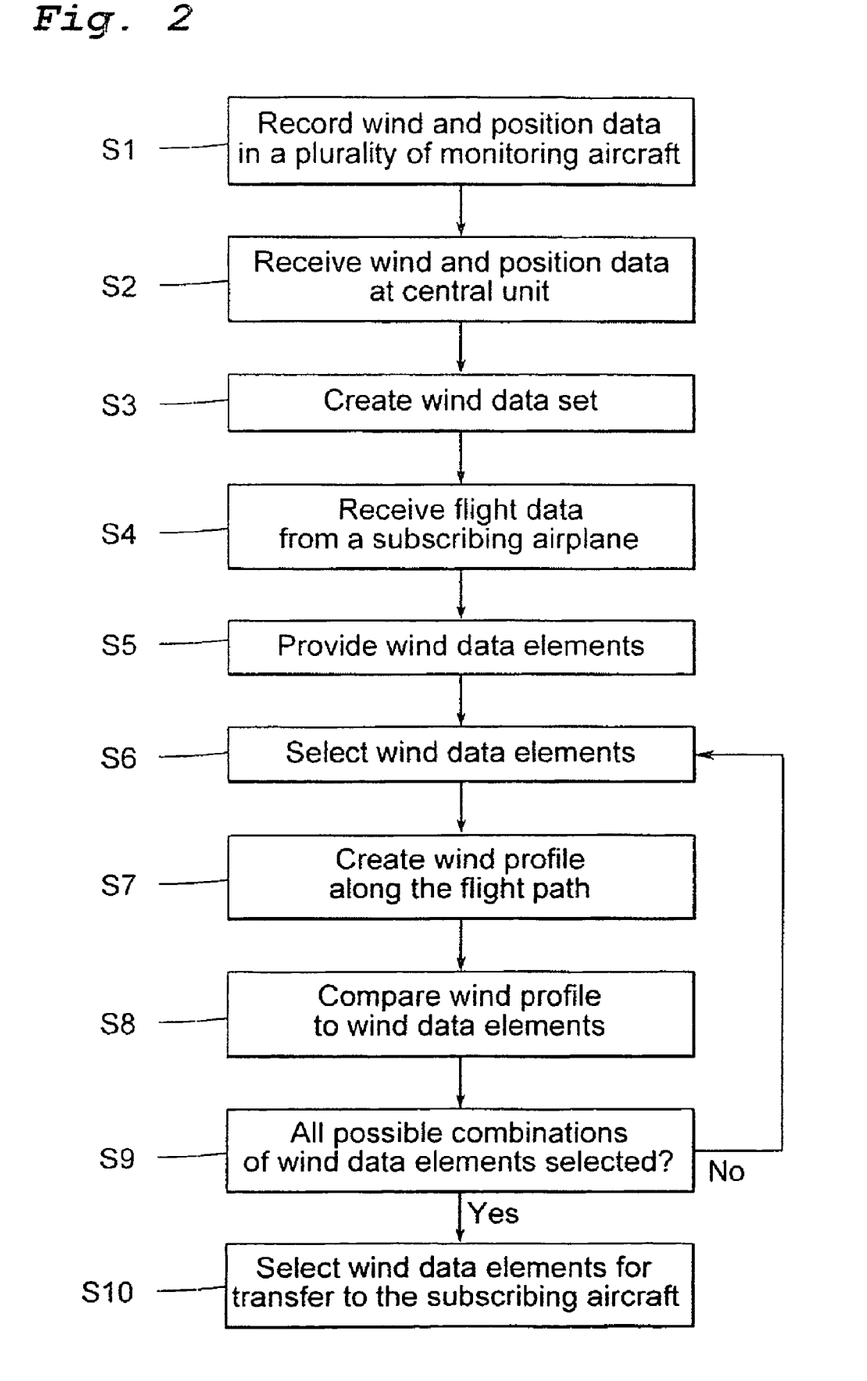
FIG. 2, shows a block diagram of steps of the method.

Reference is made to FIG. 1 and FIG. 2, showing a schematic view of an environment in which a method according to an embodiment of the invention is carried out, and a diagram of steps of the method, respectively. FIG. 1 shows a number of monitoring airplanes 1, each adapted to record atmospheric conditions and position data, (step S1 in FIG. 2). The atmospheric conditions include, amongst others, temperature and wind data, the wind data in turn including wind speed, and wind direction. The temperature, wind speed, wind direction and other atmospheric conditions are measured using equipment such as an Air Data Inertial Reference System ("ADIRS") or other local air data system. Atmospheric pressure readings can be implemented through air data modules (ADMs) using atmospheric probes to measure both total pressure and static pressure and wind speed as well. An ADM would serve as a pressure transducer to measure both static and total pressure and convert those readings to a digital flat. At predetermined intervals, the operation of measurement is triggered.

Each record of local atmospheric conditions is correlated with data regarding the time of measurement, the location of the airplane at the time of measurement, and the altitude of the airplane at the time of measurement. As is known in the art, a global positioning system GPS receiver may be used to provide the location of the airplane, including its altitude, and static barometric pressure can be used to determine altitude above sea level.

The wind and position data from the monitoring airplane 1 is received at a central unit 2, in the form of a ground station 2, in this example for flight traffic control, (FIG. 2, S2). On-board data communications equipment such as Airline Communications Addressing and Reporting System (ACARS) or SATCOM communications systems, can be used to communicate data from the airplane to the ground station.

Figure 3:
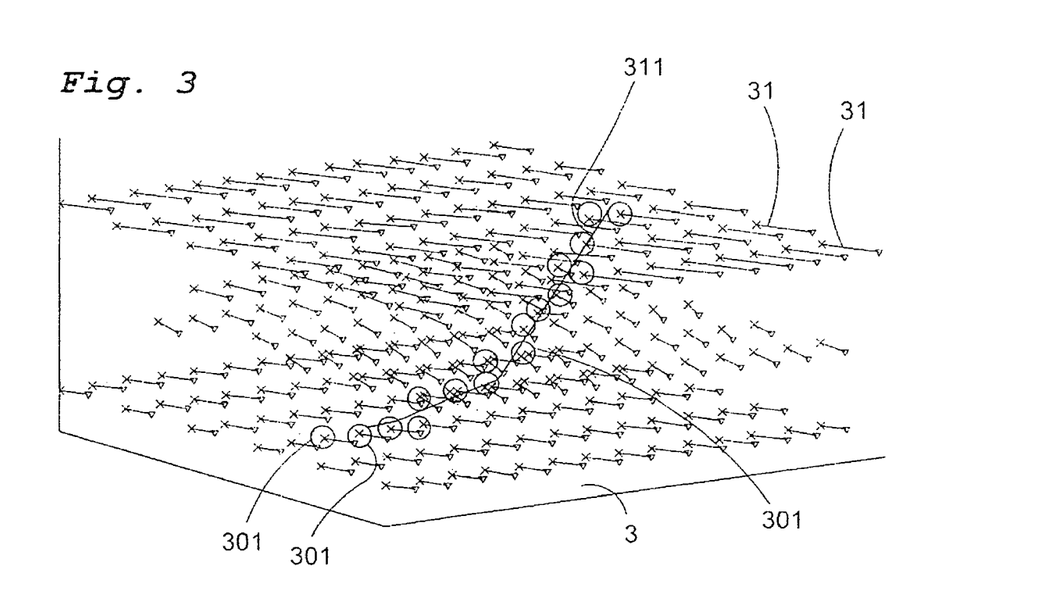
FIG. 3 shows a 3-dimensional wind model, with a schematic predicted airplane trajectory.

Referring to FIG. 3, based at least partly on the wind and position data received from the monitoring airplanes 1, a wind data set 3 is created, (FIG. 2, S3). In this embodiment, the wind data set 3 is a 3-dimensional wind model 3. As indicated in FIG. 3, the wind model 3 includes a number of pieces 31 of wind and position data, each indicating a position, marked in FIG. 3 with a symbol in the form of an x. Each piece 31 of wind and position data also indicates a wind direction and a wind speed, depicted in FIG. 3 with the direction and length, respectively, of a straight line extending from the respective x-symbol and terminating with a symbol in the form of a ∇.

Referring to FIG. 1 and FIG. 3, a so called 4DT (4-Dimensional Trajectory) is received at the ground station 2 from a subscribing airplane 4, (FIG. 2, S4). The airplane trajectory 311 is indicated in FIG. 3. The 4DT includes a 3-dimensional predicted airplane trajectory 311, indicating ground reference coordinates (latitude and longitude) and altitude, and also time data which is correlated with the predicted airplane trajectory 311.

A wind data subset 301 is selected from the wind data set 3 such that the wind data subset 301 includes wind data of positions in a vicinity of the predicted airplane trajectory 311. I.e. the wind data subset 301 is provided by mapping the wind data set 3 to the predicted airplane trajectory 311. More specifically, pieces 31 of wind and position data, marked in FIG. 3 with circles 301, in a vicinity of the predicted airplane trajectory 311, are selected for the wind data subset 301. Here, the vicinity of the predicted airplane trajectory 311 is regarded as any position within 100 km from the predicted airplane trajectory 311, preferably within 50 km from the predicted airplane trajectory 311.

Figure 4:
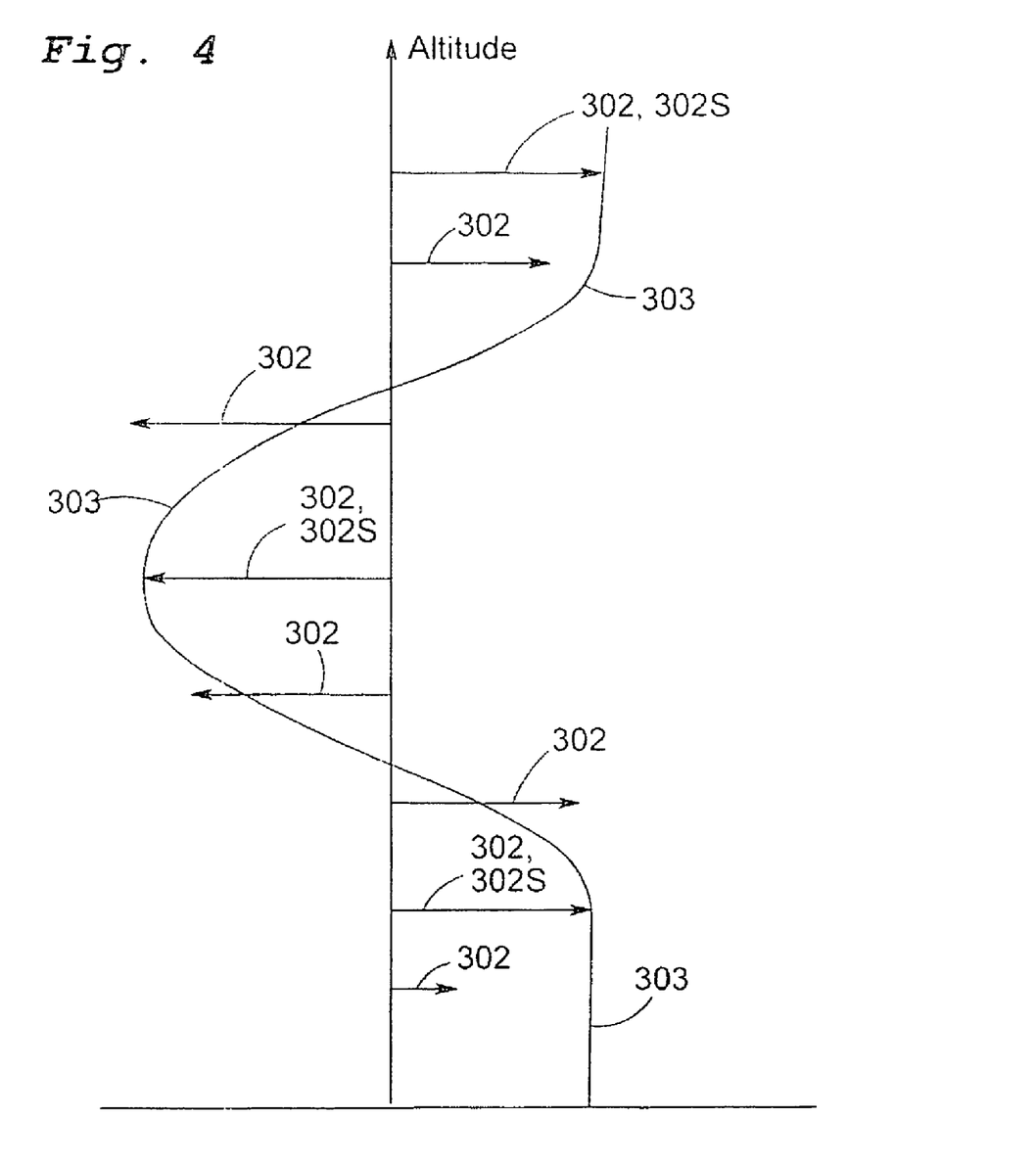
FIG. 4 shows an example of wind data elements and a wind profile based on a selected subset of the wind data elements.

FIG. 4 shows a set of wind data elements 302 provided, or determined, based on the wind data subset, (FIG. 2, S5). The wind data elements 302 correspond to components of the actual wind directions, which components are parallel to the predicted airplane trajectory 311 as projected on the ground, i.e. the wind data elements 302 correspond to head or tail wind components. Each wind data element 302 includes data concerning wind at a separate, individual position, including an altitude, along the predicted airplane trajectory 311. More specifically, the wind data elements 302 are obtained by interpolation of the wind data subset 301 to the predicted airplane trajectory 311. Yet more specifically, in this embodiment, the number and positions of the wind data elements 302 are predetermined. In FIG. 4, eight wind data elements are shown, but any number can be used, specifically a higher number. Further, in this embodiment, the wind speed and wind direction of each wind data element 302 are derived by bilinear interpolation of up to four pieces 31 of wind and position data, (FIG. 3), that are closest to the wind data element 302.

It should be mentioned that the wind speed and wind direction of each wind data element 302 can be derived by any suitable interpolation scheme, and can involve interpolation of less or more than four pieces 31 of wind and position data. Particularly, if only one piece 31 of wind and position data is available for determining a wind data element 302, the latter can be assumed to be equal to the former.

A subset of a predetermined number, in this embodiment three, of wind data elements 302S are selected arbitrarily from the set of wind data elements 302, (FIG. 3, S6). Based on the selected subset of wind data elements 302S, a wind profile 303 along the 4DT is created, (FIG. 2, S7). This is done by a suitable interpolation scheme for interpolation of the wind data elements 302S in the selected subset of wind data elements 302S. In this embodiment the wind profile 303 is created by a non-linear interpolation of the selected subset of wind data elements 302S. However, any suitable mathematical curve fitting scheme can be used for the interpolation.

Figure 5:
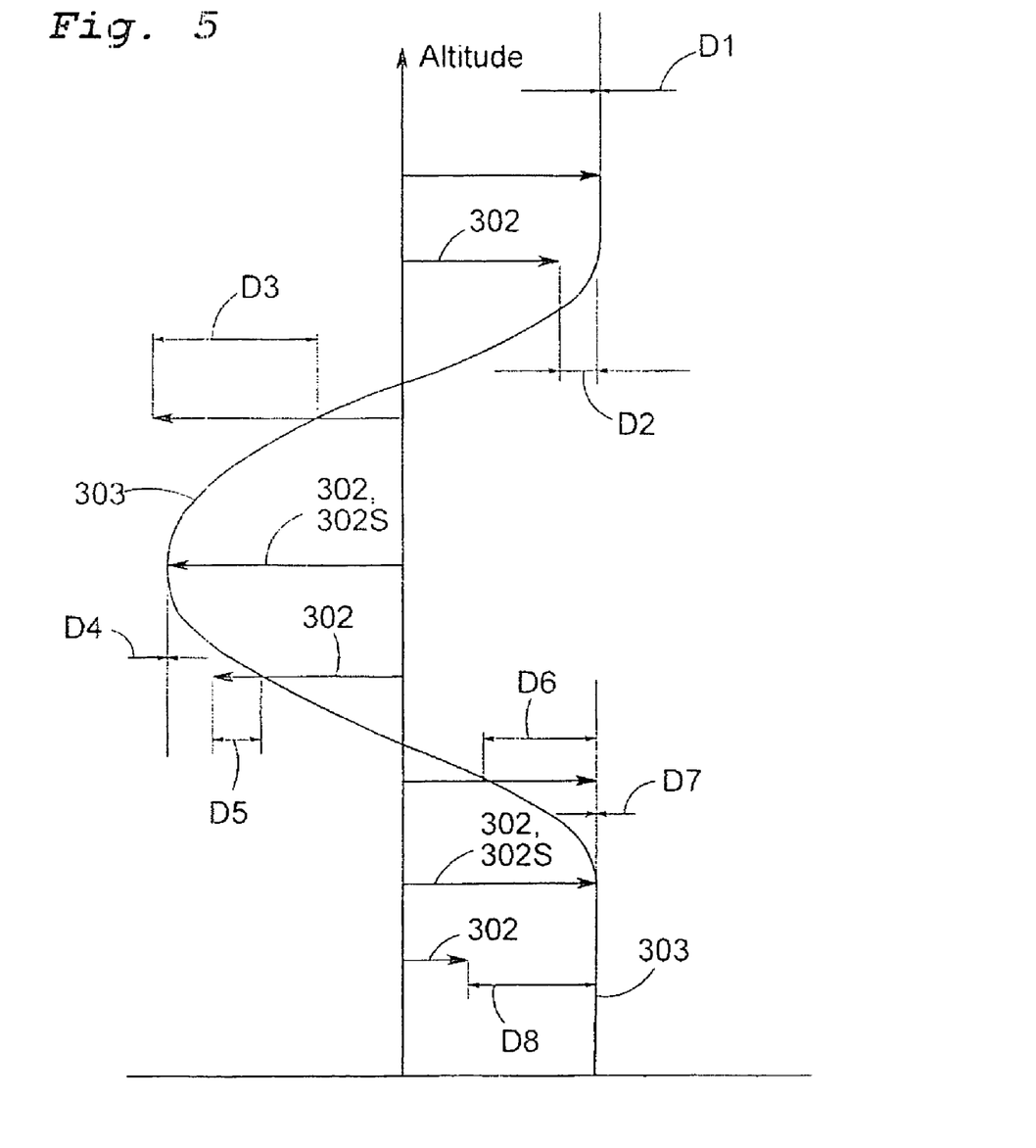
FIG. 5 shows the wind data elements and the wind profile with differences indicated.

Reference is made to FIG. 5. The wind profile 303 is compared to the set of wind data elements 302, (FIG. 2, S8). In this embodiment, this comparison includes determining a difference D1-D8 between the wind profile 303 and each wind data element 302. It should be noted that in this example some of the differences D1, D4, D7 will of course be zero. Further, the comparison includes providing a sum $SD_i$ of the square of each such difference D1-D8 between the wind profile 303 and each wind data element 302. Thus, this sum can be expressed as $$SD_i = \sum_{i=1}^{n} Di^2,$$

where n is the number of wind elements 302. The sum $SD_i$ of the squares is correlated to the wind data element selection in question.

Figure 6:
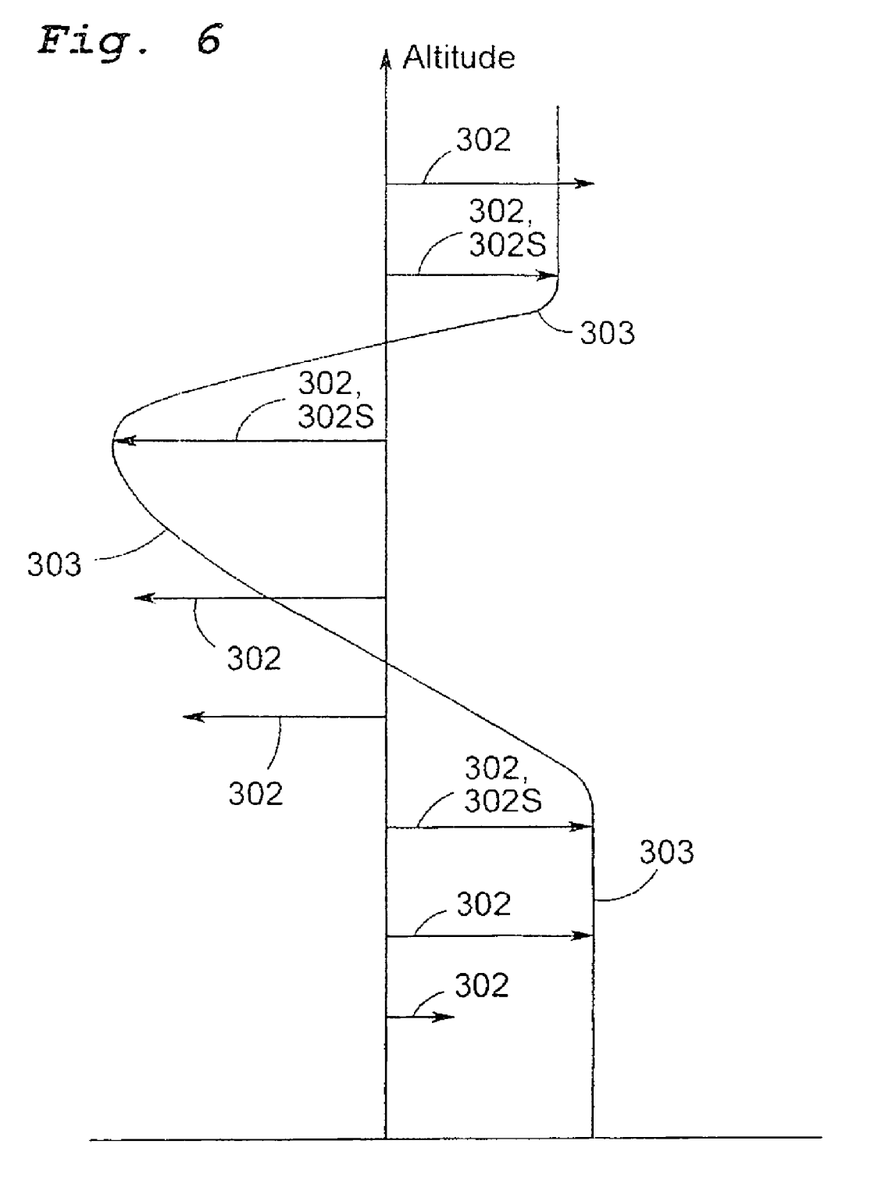
FIG. 6 shows the wind data elements in FIG. 4 and a wind profile based on another selected subset of the wind data elements.

Reference is made to FIG. 6. Until all possible combinations of the predetermined number of wind data elements 302S have been selected, (FIG. 2, S9), a new arbitrary selection of a subset of wind data elements 302S which is not equal to any prior selection 302S is made. Thus, the steps of selecting arbitrarily from the set of wind data elements a subset of a predetermined number of wind data elements, creating from the selected subset of wind data elements a wind profile along the predicted airplane trajectory 311, and comparing the wind profile to the set of wind data elements, are repeated for every combination of three wind data elements 302S. FIG. 6 shows a selection of three wind data elements 302S differing from the selection shown in FIG. 4, and a wind profile 303 created based on the selected "further" subset of wind data elements 302S.

It should be noted that, in this embodiment, in each wind profile, the wind at the highest altitude along the predicted airplane trajectory 311 is modeled as being the same as the wind of the selected wind element 302S at the highest altitude in relation to the other selected wind elements 302S. Also, in this embodiment, the wind at the ground is modeled as being the same as the wind of the selected wind element 302S at the lowest altitude in relation to the other selected wind elements 302S.

The wind data elements 302S providing a wind profile 303 corresponding to the largest extent to the set of wind data elements 302 are selected to be sent, i.e. transmitted, to the subscribing airplane 4, (FIG. 2, S10) More specifically, the wind data elements 302S of the selection correlated to the smallest sum $SD_i$ of squares, i.e. the sum of least squares, are chosen for transmission to the subscribing airplane 4.

Based on the received wind data elements 302S, suitable equipment, e.g. a flight management system, onboard the subscribing airplane can perform calculations to adjust the predicted airplane trajectory to counteract winds which could disturb the descent so that it will be less than optimal from a fuel-consumption point of view, or so that the required arrival time of the subscribing airplane will not be met. As an example, an initial airplane trajectory 311 might give a first position and time PT1 for reducing engine thrust for starting the descent. However, based on the wind data elements 302S, an adjusted airplane trajectory 311 might give a second position and time PT2 for reducing engine thrust for starting the descent, differing from the first position and time PT1. The received wind data elements 302S, will allow for optimization of the fuel-consumption and an improvement of the flight predictability. The wind data elements 302S will provide the subscribing airplane 4 with such optimally selected, effective information, while at the same time keeping the bandwidth requirements for transmitting the wind data elements 302S low.

Alternatives to the embodiment described above are possible within the scope of the claims. For example, the wind data elements 302 can include the actual wind directions. Thereby, the steps of creating a wind profile 303 along the predicted airplane trajectory 311, and comparing the wind profile 303 to the set of wind data elements 302, can include extracting components of the wind data elements 302 parallel to the predicted airplane trajectory 311.

Figure 7:
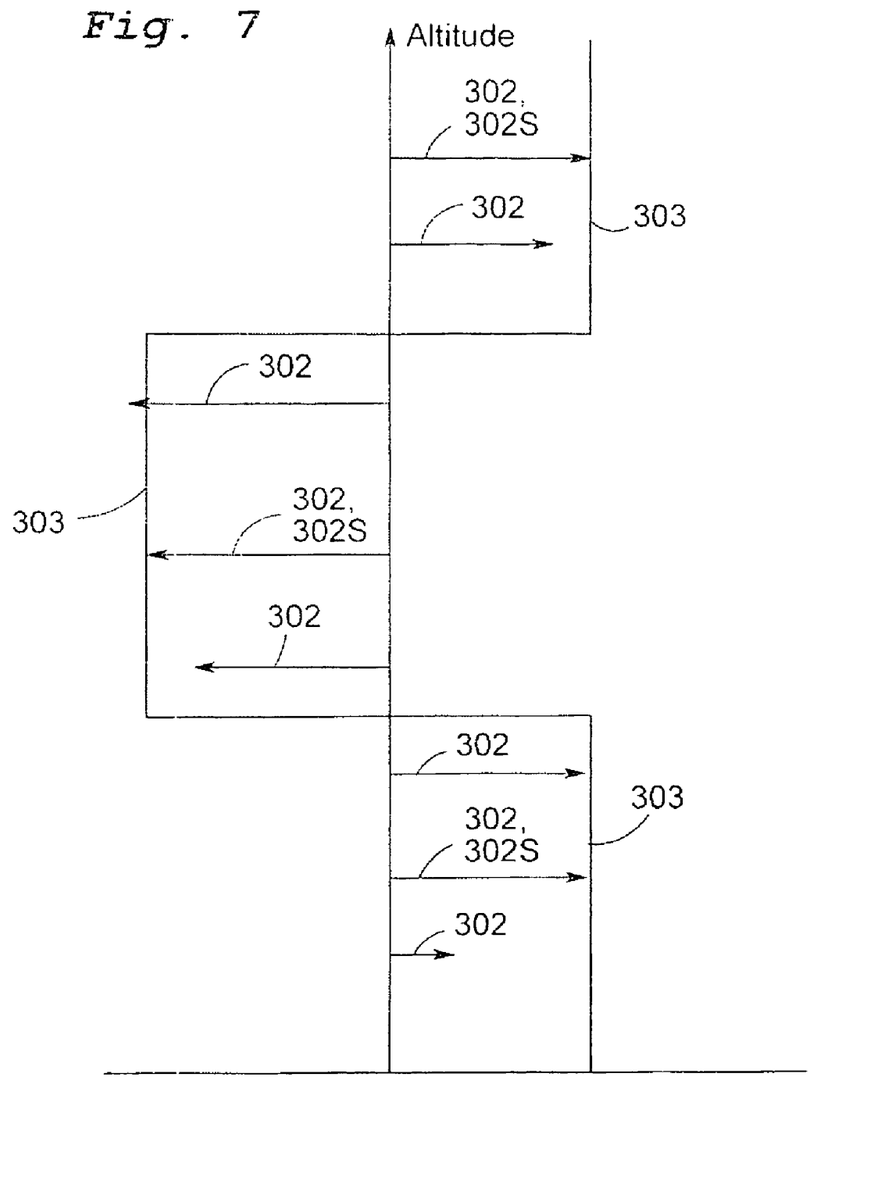
FIG. 7 shows an example of wind data elements and an alternative wind profile based on a selected subset of the wind data elements.

Alternatively, or in addition, the wind profile 303 along the 4DT can be created based on the selected subset of wind data elements 302S, by an interpolation scheme differing from the one described above. As an example, FIG. 7 shows a wind profile 303 created by setting the value of the respective selected wind element 302S over an entire respective altitude interval including the respective selected wind element 302S.

As mentioned, the subscriber can be a ground station, for flight traffic control. Thereby, the invention can be used to adjust and improve predicted airplane trajectories. For example, a special unit on the ground, (not shown in the figures), can receive data for a predicted airplane trajectory 311 from the ground station 2. The airplane trajectory can for example be a trajectory of a major part of a flight of an airplane from departure to arrival. The special unit can be adapted to provide a wind data set 3 including wind data of a plurality of positions in a region in which the flight takes place. The special unit can also be adapted to provide, based on the wind data set 3, a set of wind data elements 302, each including data concerning wind at a position along the predicted airplane trajectory 311. In a manner similar to what was described above, the special unit can repeat steps of selecting a subset of a predetermined number of wind data elements 302S, creating a wind profile 303, and comparing the wind profile 303 to the set of wind data elements 302, and select to be sent to the ground station 2 an optimal subset of wind data elements 302S.

It should also be mentioned that in some embodiments the receiver of data for a predicted airplane trajectory 311, and the receiver of the subset of wind data elements 302S can be physically or logically separated items within the same unit.

The invention claimed is:

1. A method comprising the steps of
providing data related to wind, and sending data related to wind to a subscriber,
wherein the step of providing data related to wind comprises providing a wind data set including wind data of a plurality of positions, and in that the method further comprises the steps of
receiving data for a predicted airplane trajectory,
providing, based on the wind data set, a set of wind data elements, each including data concerning wind at a position along the predicted airplane trajectory,
selecting from the set of wind data elements a subset of wind data elements,
creating, based at least partly on the selected subset of wind data elements, a wind profile along the predicted airplane trajectory,
comparing the wind profile to the set of wind data elements,
repeating the steps of selecting a subset of wind data elements, creating a wind profile, and comparing the wind profile to the set of wind data elements, and
selecting to be sent to the subscriber a subset of wind data elements based at least partly on which a wind profile was created corresponding to the largest extent to the set of wind data elements,
wherein the step of sending data related to wind to the subscriber comprises sending to the subscriber the subset of wind data elements selected to be sent.

2. A method according to claim 1, wherein the predicted airplane trajectory includes at least a portion of a descent to an airport of an airplane.

3. A method according to claim 2, wherein a position and/or a time of a start of the descent is determined or adjusted based at least partly on the subset of wind data elements sent to the subscriber.

4. A method according to claim 2, wherein a speed of descent of the airplane is determined or adjusted based at least partly on the subset of wind data elements sent to the subscriber.

5. A method according to claim 1, wherein the step of providing, based on the wind data set, a set of wind data elements, comprises selecting from the wind data set a wind data subset such that the wind data subset includes wind data of positions in a vicinity of the predicted airplane trajectory, and providing, based on the wind data subset, the set of wind data elements.

6. A method according to claim 5, wherein the step of providing, based on the wind data subset, a set of wind data elements, includes interpolation of wind data of the wind data subset to the predicted airplane trajectory.

7. A method according to claim 1, wherein the step of creating, from the selected subset of wind data elements, a wind profile along the predicted airplane trajectory, includes interpolation of the selected subset of wind data elements.

8. A method according to claim 1, wherein the wind profile includes head and/or tail wind components.

9. A method according to claim 1, wherein, in addition to the data for the predicted airplane trajectory, time data correlated to the data for the predicted airplane trajectory is received.

10. A method according to claim 1, comprising adjusting the predicted airplane trajectory based at least partly on the subset of wind data elements selected to be sent.

11. A computer program comprising non-transitory computer readable code means causing a computer to perform the steps of
providing, based on a wind data set including wind data of a plurality of positions, a set of wind data elements, each including data concerning wind at a position along a predicted airplane trajectory,
selecting from the set of wind data elements a subset of wind data elements,
creating, based at least partly on the selected subset of wind data elements, a wind profile along the predicted airplane trajectory,
comparing the wind profile to the set of wind data elements,
repeating the steps of selecting a subset of wind data elements, creating a wind profile, and comparing the wind profile to the set of wind data elements, and
selecting to be sent to a subscriber a subset of wind data elements based at least partly on which a wind profile was created corresponding to the largest extent to the set of wind data elements.

12. A computer program according to claim 11, wherein the predicted airplane trajectory includes at least a portion of a descent to an airport of an airplane.

13. A computer program according to claim 11, wherein the step of providing, based on the wind data set, a set of wind data elements, comprises selecting from the wind data set a wind data subset such that the wind data subset includes wind data of positions in a vicinity of the predicted airplane trajectory, and providing, based on the wind data subset, the set of wind data elements.

14. A computer program according to claim 13, wherein the step of providing, based on the wind data subset, a set of wind data elements, includes interpolation of wind data of the wind data subset to the predicted airplane trajectory.

15. A computer program according to claim 11, wherein the step of creating, from the selected subset of wind data elements, a wind profile along the predicted airplane trajectory, includes interpolation of the selected subset of wind data elements.

16. A computer program according to claim 11, wherein the wind profile includes head and/or tail wind components.

17. A computer program according to claim 11, wherein, in addition to the data for the predicted airplane trajectory, time data correlated to the data for the predicted airplane trajectory is received.

18. A computer program product comprising a non-transitory computer readable medium, having stored thereon a computer program according to claim 11.

* * * * *